United States Patent
Ferreira Moreno et al.

(10) Patent No.: US 12,093,849 B2
(45) Date of Patent: Sep. 17, 2024

(54) SMART SENSING: A SYSTEM AND A METHOD FOR DISTRIBUTED AND FAULT TOLERANT HIERARCHICAL AUTONOMOUS COGNITIVE INSTRUMENTATION

(71) Applicant: International Business Machines Corporation, Armonk, NY (US)

(72) Inventors: Marcio Ferreira Moreno, Rio de Janeiro (BR); Rafael Rossi de Mello Brandao, Rio de Janeiro (BR); Daniel Salles Chevitarese, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 15/335,050

(22) Filed: Oct. 26, 2016

(65) Prior Publication Data
US 2018/0114137 A1   Apr. 26, 2018

(51) Int. Cl.
*G06N 7/02* (2006.01)
*G06N 3/008* (2023.01)
*G06N 3/063* (2023.01)
*G06N 5/02* (2023.01)
*G06N 5/043* (2023.01)

(52) U.S. Cl.
CPC ............. *G06N 7/023* (2013.01); *G06N 3/008* (2013.01); *G06N 5/02* (2013.01); *G06N 5/043* (2013.01); *G06N 3/063* (2013.01)

(58) Field of Classification Search
CPC .......... G06N 7/023; G06N 5/02; G06N 5/043; G06N 3/008; G06N 3/063
See application file for complete search history.

(56) References Cited

U.S. PATENT DOCUMENTS

| | | | |
|---|---|---|---|
| 7,688,793 B2 * | 3/2010 | Rittle | H04L 67/12 370/335 |
| 2003/0140020 A1 * | 7/2003 | Chen | G06N 3/0436 706/15 |
| 2003/0151513 A1 * | 8/2003 | Herrmann | G08B 25/003 340/573.1 |

(Continued)

OTHER PUBLICATIONS

Snider, From Synapses to Circuitry: Using Memristive Memory to Explore the Electronic Brain (Year: 2011).*

(Continued)

*Primary Examiner* — Abdullah Al Kawsar
*Assistant Examiner* — Tewodros E Mengistu
(74) *Attorney, Agent, or Firm* — Michael O'Keefe

(57) ABSTRACT

A modular node includes a semiconductor chip, including modular sensors to detect events or changes in environment, modular actuators for moving or controlling an object, a non-transitory computer readable medium storing a program, a processor executing the program configured to control module networking and setup, and a neuromorphic chip configured to receive information from the modular sensors and modular actuators, autonomously process the information received from the modular sensors and actuators, determine a validity of the information received from the modular sensors and actuators, and autonomously communicate with neighboring modular nodes for network auto-arrangement.

20 Claims, 19 Drawing Sheets

(56) References Cited

U.S. PATENT DOCUMENTS

| | | | | |
|---|---|---|---|---|
| 2008/0243734 A1* | 10/2008 | Deco | ............... | G06N 3/02 |
| | | | | 706/16 |
| 2012/0004782 A1* | 1/2012 | Koskan | ............... | H04L 67/303 |
| | | | | 700/291 |
| 2014/0223561 A1* | 8/2014 | Mitola, III | ............... | G06F 11/0721 |
| | | | | 726/23 |
| 2015/0127149 A1* | 5/2015 | Sinyavskiy | ............... | B25J 9/163 |
| | | | | 700/250 |
| 2015/0178620 A1* | 6/2015 | Ascari | ............... | G06N 3/063 |
| | | | | 706/21 |
| 2017/0193136 A1* | 7/2017 | Prasad | ............... | G06F 30/327 |
| 2017/0279835 A1* | 9/2017 | Di Pietro | ............... | H04L 63/1425 |

OTHER PUBLICATIONS

Painkras, SpiNNaker: A 1-W 18-Core System-on-Chip for Massively-Parallel Neural Network Simulation (Year: 2013).*

Chen, Distributed Collaborative Control for Industrial Automation With Wireless Sensor and Actuator Networks (Year: 2010).*

Littman, A Distributed Reinforcement Learning Scheme for Network Routing (Year: 1993).*

Mel, et al. "The NIST Definition of Cloud Computing". Recommendations of the National Institute of Standards and Technology. Nov. 16, 2015.

* cited by examiner

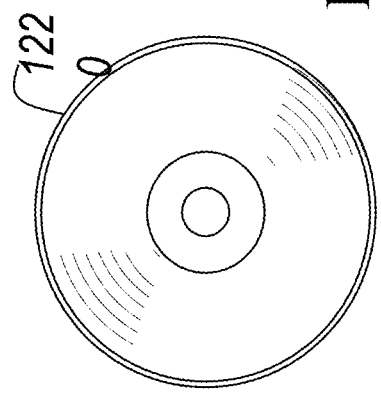
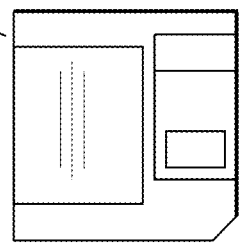
FIG. 16
1200
122
1210

SMART SENSING: A SYSTEM AND A METHOD FOR DISTRIBUTED AND FAULT TOLERANT HIERARCHICAL AUTONOMOUS COGNITIVE INSTRUMENTATION

BACKGROUND OF THE INVENTION

Field of the Invention

The present invention relates generally to a method, system and apparatus for smart sensing, and more particularly relates to a method, system, and apparatus for distributed and fault tolerant hierarchical autonomous cognitive instrumentation.

Description of the Related Art

Currently, it is very difficult to setup a system to monitor environments. Environmental monitoring includes, for example but not limited to, processes and activities that need to take place to characterize and monitor the quality of the environment. Environmental monitoring can be used in the preparation of environmental impact assessments, growing agricultural products, manufacturing certain products affected by the environment, and many other implementations.

Monitoring of environments have had to include excessive user intervention or manual control, where a user is needed to input or control certain aspect of the sensors used. The automation of such devices has been difficult because of the manual modification and control that are needed.

Today's distributed sensing solutions tend to be an inefficient use of network and susceptible to catastrophic failure situations when there is failure or connectivity is lost. In addition, current systems have predefined rules to be applied in case of problem, which means that those rules are fixed and fuzzy situations are not considered treated always the same way. Also, current solutions have to transmit high quantity of data in real-time or near real-time, in order to promptly notify users about problematic situations. Finally, current solutions require users to know low-level details about the monitoring infrastructure, such as sensors and actuators. This increases the need for manual user intervention and thus increasing cost and inefficiencies.

There is a need to address the inefficient use of energy, which usually is rectified by reducing computer power. There is also a need to provide instrumentation environments in an easy way with power-efficient nodes that smartly monitors scenarios of interest. There is also a need to provide an efficient technique of smart sensing.

SUMMARY OF INVENTION

In view of the foregoing and other problems, disadvantages, and drawbacks of the aforementioned background art, an exemplary aspect of the present invention provides smart sensing including a method, system, and apparatus for distributed and fault tolerant hierarchical autonomous cognitive instrumentation.

One aspect of the present invention provides a modular node, includes a semiconductor chip, including modular sensors to detect events or changes in environment, modular actuators for moving or controlling an object, a non-transitory computer readable medium storing a program and a neuromorphic hardware configuration, a processor to control module networking and setup, and a neuromorphic hardware configured executing the program configured to receive information from the modular sensors and modular actuators, autonomously process the information received from the modular sensors and actuators, determine a validity of the information received from the modular sensors and actuators, and autonomously communicate with neighboring modular nodes for network auto-arrangement.

Another aspect of the present invention provides a method of a modular node, the method including receiving information from a plurality of modular sensors and modular actuators, autonomously processing the information received from the modular sensors and actuators, determining a validity of the information received from the modular sensors and actuators, and autonomously communicating with neighboring modular nodes for network auto-arrangement.

Yet another aspect of the present invention provides a computer program product for distributed and fault tolerant hierarchical autonomous cognitive instrumentation, the computer program product comprising a computer readable storage medium having program instructions embodied therewith, the program instructions readable and executable by a computer and neuromorphic hardware configuration loadable by the neuromorphic chip to cause the computer to receive information from a plurality of modular sensors and modular actuators, autonomously process the information received from the modular sensors and actuators, determine a validity of the information received from the modular sensors and actuators, and autonomously communicate with neighboring modular nodes for network auto-arrangement.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF DRAWINGS

The exemplary aspects of the invention will be better understood from the following detailed description of the exemplary embodiments of the invention with reference to the drawings.

FIG. 16 illustrates a signal-bearing storage medium for storing machine-readable instructions of a program that implements the method according to the exemplary embodiment of the invention.

DETAILED DESCRIPTION OF A PREFERRED EMBODIMENTS

Figure 1:
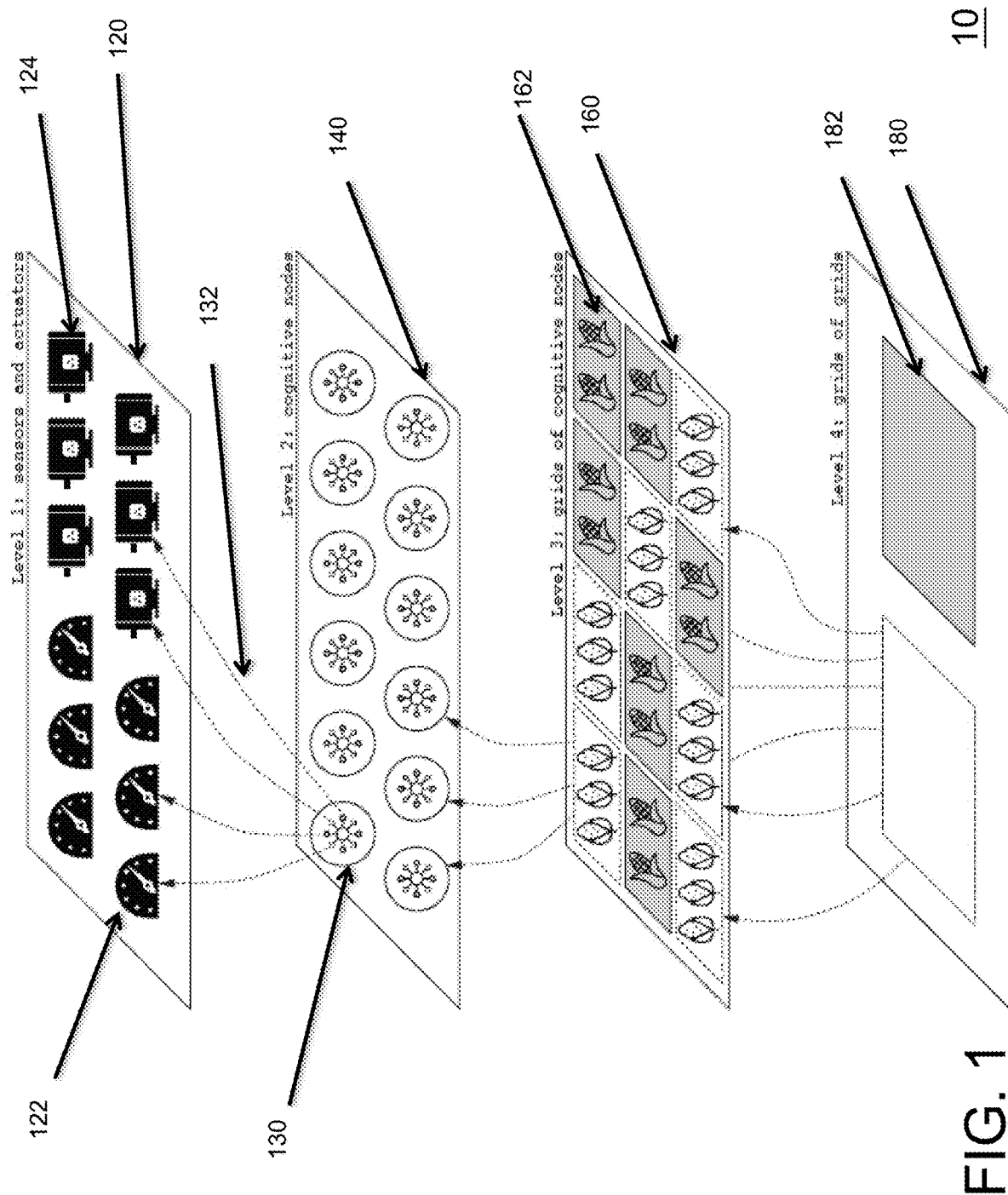
FIG. 1 illustrates hierarchical levels of a system of an exemplary embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

As mentioned, today's distributed sensing solutions tend to be centralized, only collecting data in loco and do not process it locally, which leads to an inefficient use of network, catastrophic failure situations when central node fails or connectivity is lost. In addition, current systems have predefined rules to be applied in case of problem, which means that those rules are fixed and fuzzy situations are treated always the same way. Also, current solutions have to transmit high quantity of data in real-time or near real-time, in order to promptly notify users about problematic situations. Finally, current solutions require users to know low-level details about the monitoring infrastructure, such as sensors and actuators.

There is a need to address the inefficient use of energy, which usually is rectified by reducing computer power. There is also a need to provide instrumenting environments in an easy way with power-efficient nodes that smartly monitors scenarios of interest.

There is a need have an implementation of IoT (Internet of Things) and domain experts in such systems of monitoring. There is a problem where there are explicit predefined rules that are static. There is also a lack of connectivity in-loco with current systems. For example, when you go to an area where a crop is grown, there is very limited connectivity available in the remote areas. Additionally, in those remote areas, there is not much power available to turn computers on that can manage such devices. There is also a need to provide an efficient technique of smart sensing.

Therefore, it is desired to have a distributed network with low power consumption.

A network of modular nodes is proposed including a neuromorphic chip, sensors and actuators for IoT (CogNode, cognitive node). Each node can autonomously perceive the environment. The solution creates a cognitive resiliency that evolves by itself and adapts according to previous situations. Per node, the energy used is at least 4 orders of magnitude less energy than a related art computer system. The neuromorphic nodes mimics neurons and synapses in hardware. The processing power each node allows it process the information and send the final phase of the information. For example, if a camera obtains and processes a series of frames, then only the information inside the processed frames are transmitted out of the node instead of sending out the unprocessed information to a centralized processor as seen in the related art. Each node can process the entire information. Additionally, Neuromorphic Programs (NP) do not define a sequence of operations as observed in regular procedural coding. Instead, NP specifies a neural network topology that will be loaded into the neuromorphic chip.

Figure 2:
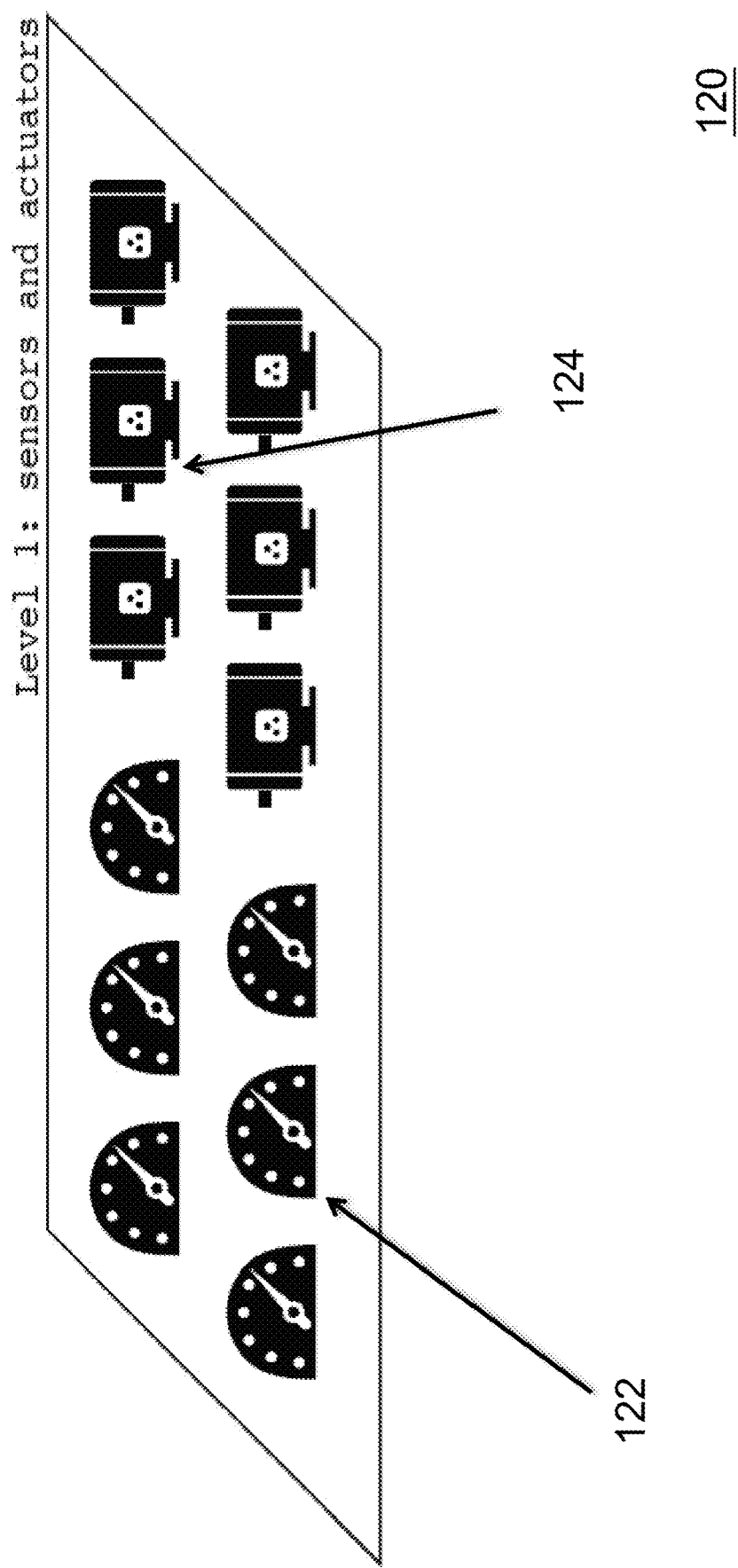
FIG. 2 illustrates the sensors and actuators in level 1 of the exemplary embodiment.

FIG. 1 illustrates hierarchical levels of a system 10 of an exemplary embodiment. With reference to FIGS. 1 and 2, in the first level 120, there are sensors 122 and actuators 124 that can be combined to monitor different types of scenarios. Those components (122 and 124) can be plug-and-play as linked 132 to the CogNode 130. The user can easily remove them from the CogNode 132 as seen in level 2 (140).

In the second level 140, the CogNodes 130 with preconfigured neuromorphic programs that create the desirable behavior of each node. The CogNodes 130 immediately start to monitor the environment when inserted in the system.

In the third level 160, a user can group those nodes by function, locale or any other scenario, or any property, as a grid 162 of CogNodes 130. For example, a user may need to check parameters A, B, C that are combined in a specific way, then one can program these CogNodes to monitor the parameters in this specific way. When it is possible, the CogNodes can always communicate with each other autonomously.

For example, if a crop needs to be monitored, then setup the system 10 such that CogNodes 130 are set up to monitor crop A or crop B or any other crop, the CogNodes 130 will communicate with each other and find the best route to send the information to the user.

For example, if a CogNode 130 has a problem in the temperature sensor, the CogNode 130 can autonomously ask for help from another CogNode 130. The CogNode 130 with the problem in the temperature sensor can request from a neighboring CogNode 130 to share their temperature measurement. For example, if a CogNode measures 100 degrees Celsius and it knows that maybe impossible, it can ask for help from another CogNode. This helps with resiliency.

FIG. 2 illustrates the sensors and actuators in level 1 of the exemplary embodiment. A close-up of the sensors 122 and actuators 124 are shown. The first level 120 consists of sensor 122 and actuators 124 that can be plugged to the CogNode 130 that will extend the node's functionality. Those sensors 122 include, but are not limited to, thermometers, barometers, RF (radio frequency) antennae, hyper-spectral cameras, infra-red or ultra-violet sensors, hygrometer, etc. Actuators 124 can also be added in order to automate some of the responses to scenarios of interest. For instance, when a CogNode 130 detects a situation where irrigation is needed, an actuator 124 could be used to open the corresponding mechanical valves.

Figure 3:
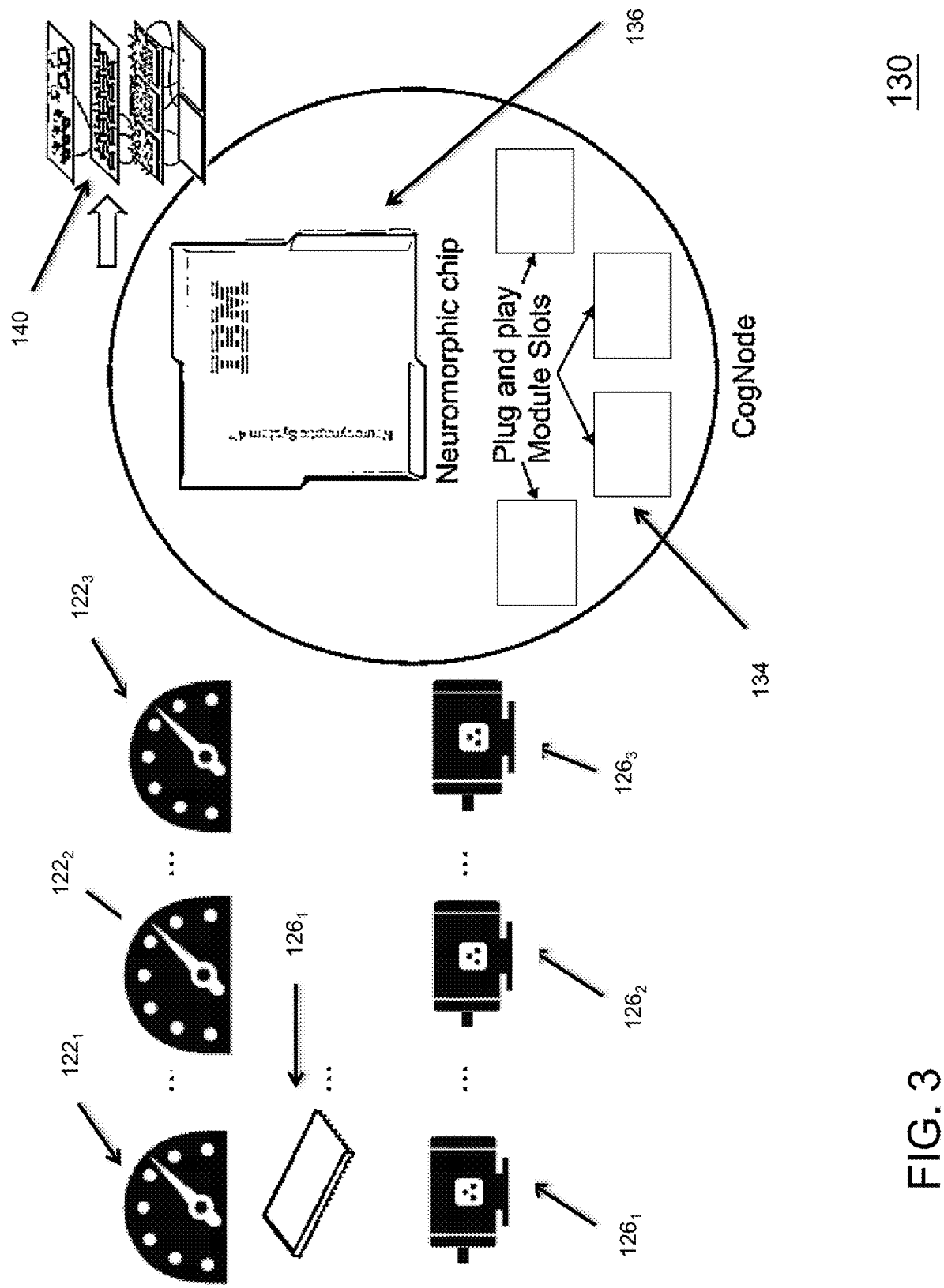
FIG. 3 illustrates the cognitive nodes of level 2.

FIG. 3 illustrates the cognitive nodes of level 2. Within the CogNode 130, there is a neuromorphic chip that has plug and play module slots where any of the sensors 122 and actuators 124 can be added. Other types of neuromorphic chips or other hardware can be used instead of the neumorphic chip 136. the CogNode 130 can be the neuromorphic chip, which can include millions of neurons. For example, if the sensors noticed the temperature and humidity levels are at a certain point, then a certain decision can be made by the neuromorphic chip.

The sensors 122 can include, for example, a temperature sensor $122_1$, a photoelectric sensor $122_2$, humidity sensor $122_3$. Other possible sensors can also be used. Additionally, there can be a low-power WI-FI chip $126_1$. Other possible communication or other type of chips can be used. The actuators 126 can be, for example, an electric actuator $126_1$, a hydraulic actuator $126_2$, and a mechanical actuator $126_3$. Other types of actuators can also be used. These actuators can be plugged into the module slots 134 of the CogNode 130. As mentioned, the CogNode 130 includes a neuromorphic chip 136 or another ultra low-power processing chip.

Therefore, the second level 140 refers to the cognitive node 130, its main elements are depicted in FIG. 3. In addition to the components from the first level (sensors 122 and actuators 124) 120, the node 130 includes (1) a power solution 128 (See FIG. 10) that can be a battery, a generator or a composition of both; (2) a low-power wireless network module 126 responsible for receiving and transmitting data. Optionally, it can power the cognitive node 130 by using wireless power transfer (WPT) technology; and (3) the neuromorphic unit that processes all sensors' data, sends actions to actuators and communicates to other nodes through the network.

Figure 4:
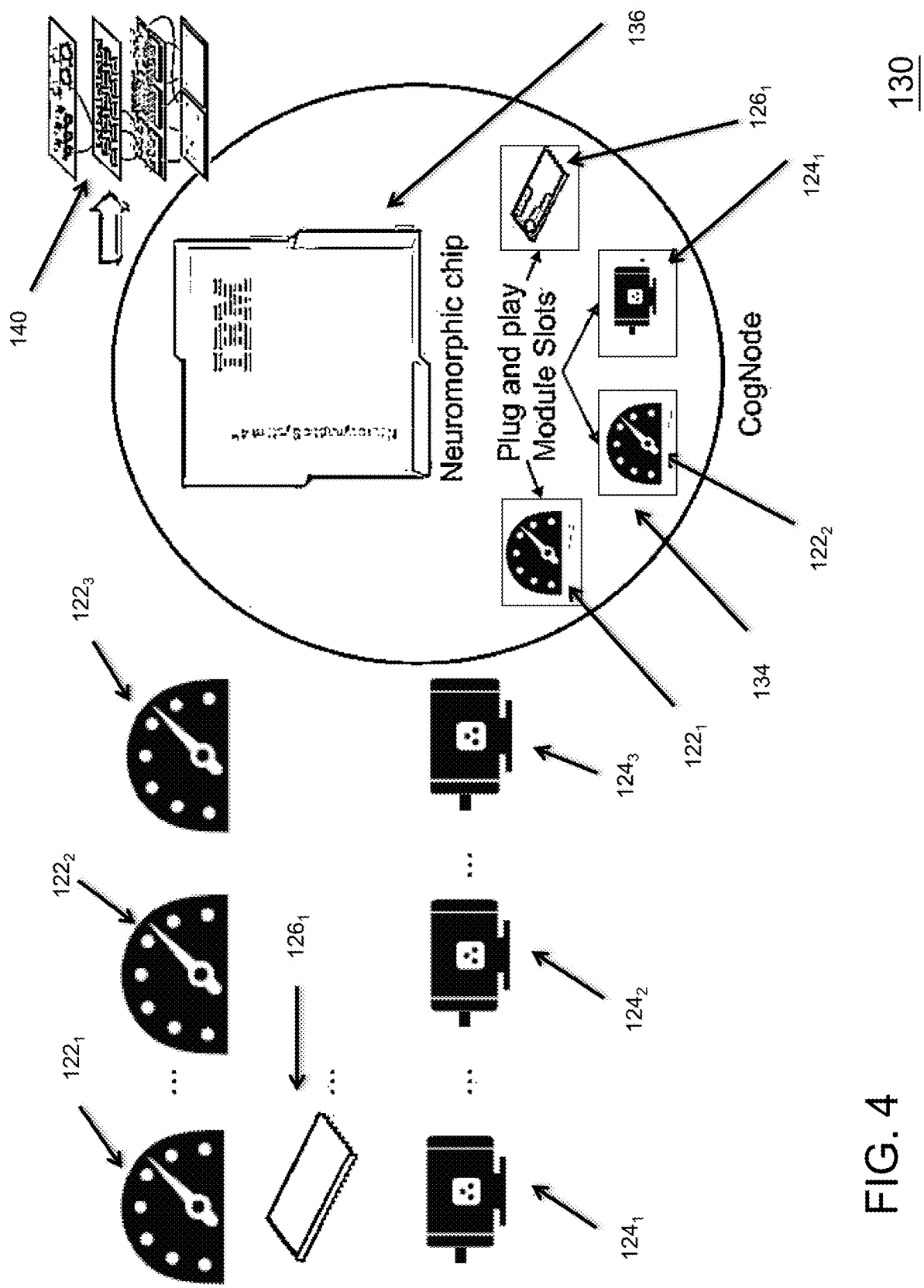
FIG. 4 illustrates a further description of the cognitive nodes of an exemplary embodiment.

FIG. 4 illustrates a further description of the cognitive nodes of an exemplary embodiment. In an example, the temperature sensor $122_1$, photoelectric sensor $122_2$, the electric actuator $124_1$ and the low-power WI-FI chip $126_1$ are plugged into the CogNode 130. This adds to the versatility of the CogNode.

Figure 5:
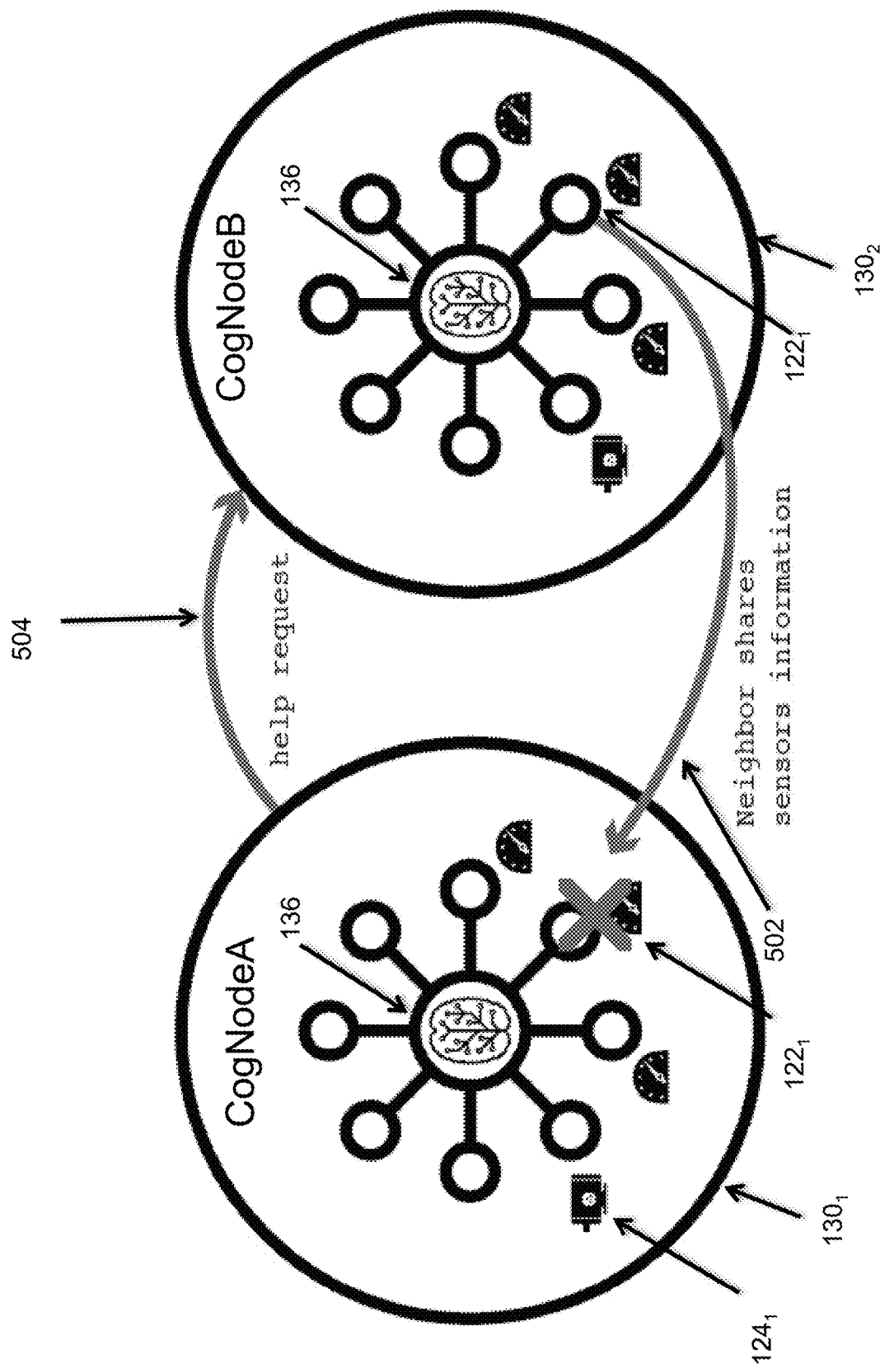
FIG. 5 illustrates a sensor failure situation and help request for neighbor nodes of the exemplary embodiment.

FIG. 5 illustrates a process of the cognitive nodes of the exemplary embodiment. The resiliency is shown. When there is problem, the node (CogNode A) $130_1$ can request help and help, where a signal 502 can be sent form the neighboring node $130_2$. Therefore, there needs to be intelligence within each node 130. Therefore, the nodes 130 needs to be able to detect problems within itself. For example, the node 130 needs to detect that the signal received from the sensor 122 is correct or not. In this example, the CogNode A $130_1$ has a sensor $122_1$ that is offline, then a signal 504 is sent to CogNode B $130_2$. The CogNode B $130_2$ then sends a help signal using the information from its related sensor $122_1$ back to CogNode A $130_1$.

Figure 6:
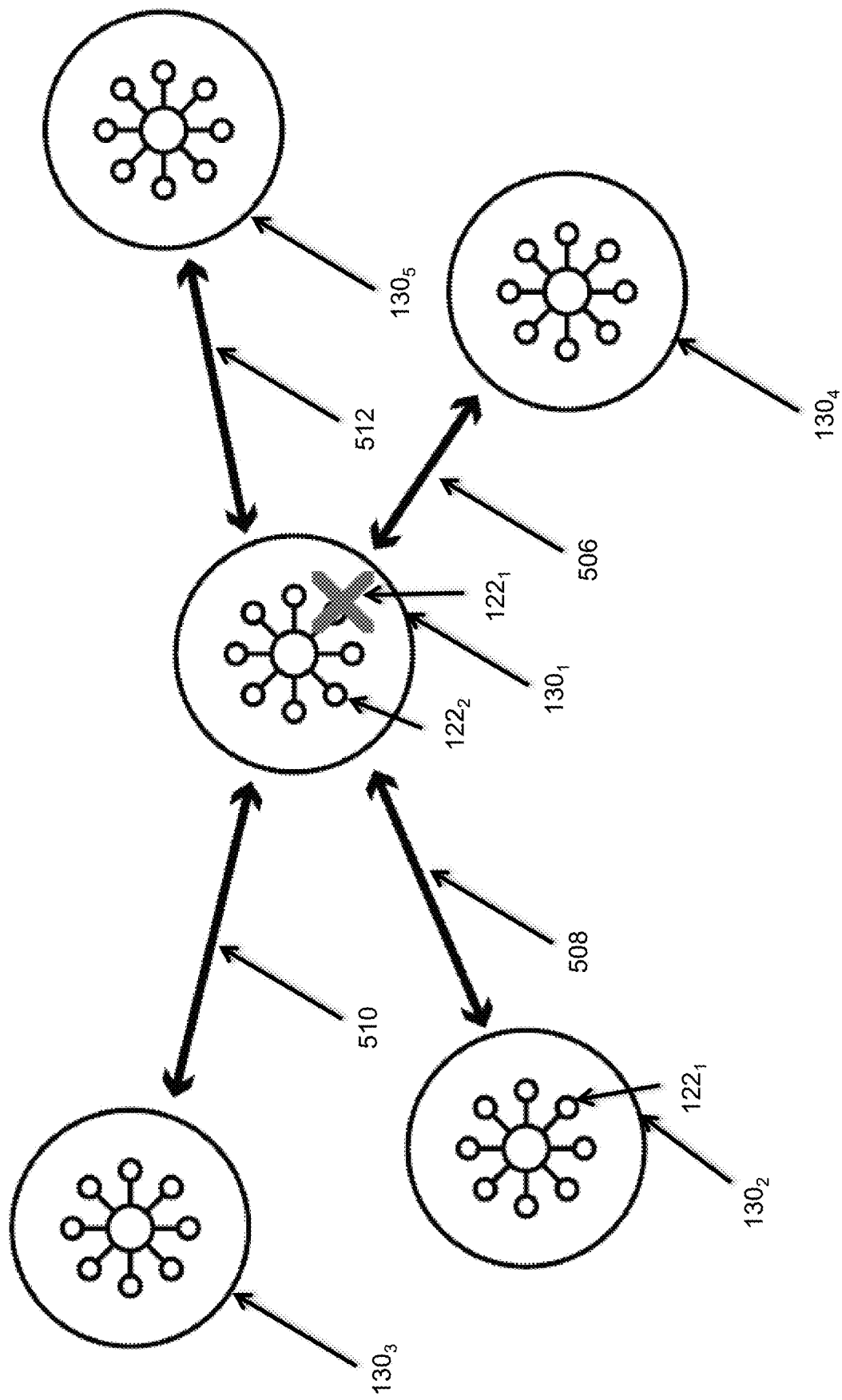
FIG. 6 illustrates a further detail about the failure situation of the cognitive nodes in level two.

FIG. 6 illustrates a further detail of the cognitive nodes in level 2. For example, in CogNode $130_1$ with a problem in sensor $122_1$, the bidirectional communication 506, 508, 510 or 512 can be used for communication with CogNodes $130_2$, $130_3$, $130_4$, or $130_5$. The signal paths 506-512 can be obtained to get information from any one or more of the neighboring CogNodes $130_2$, $130_3$, $130_4$, or $130_5$ from the sensors $122_1$ within those neighboring nodes.

Figure 7:
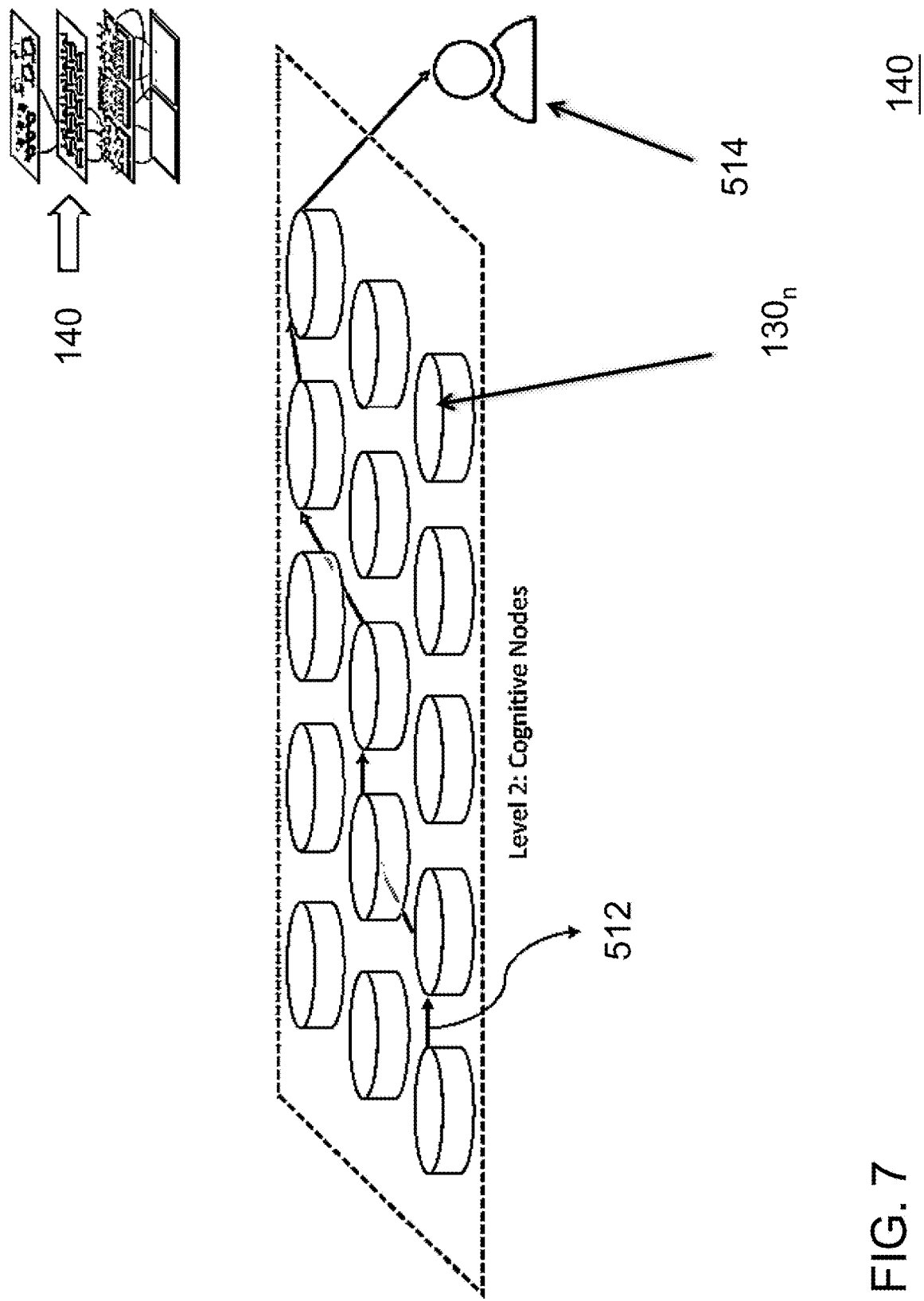
FIG. 7 illustrates the deployment of the cognitive nodes in level two.

FIG. 7 illustrates the deployment of the cognitive nodes in level 2. The CogNodes 130 can find automatically the optimal route 512 to the user 514. This helps to provide the distributive solution. The information (e.g., crop information or other detected information) will already be processed and summarized in each node 130.

Figure 8:
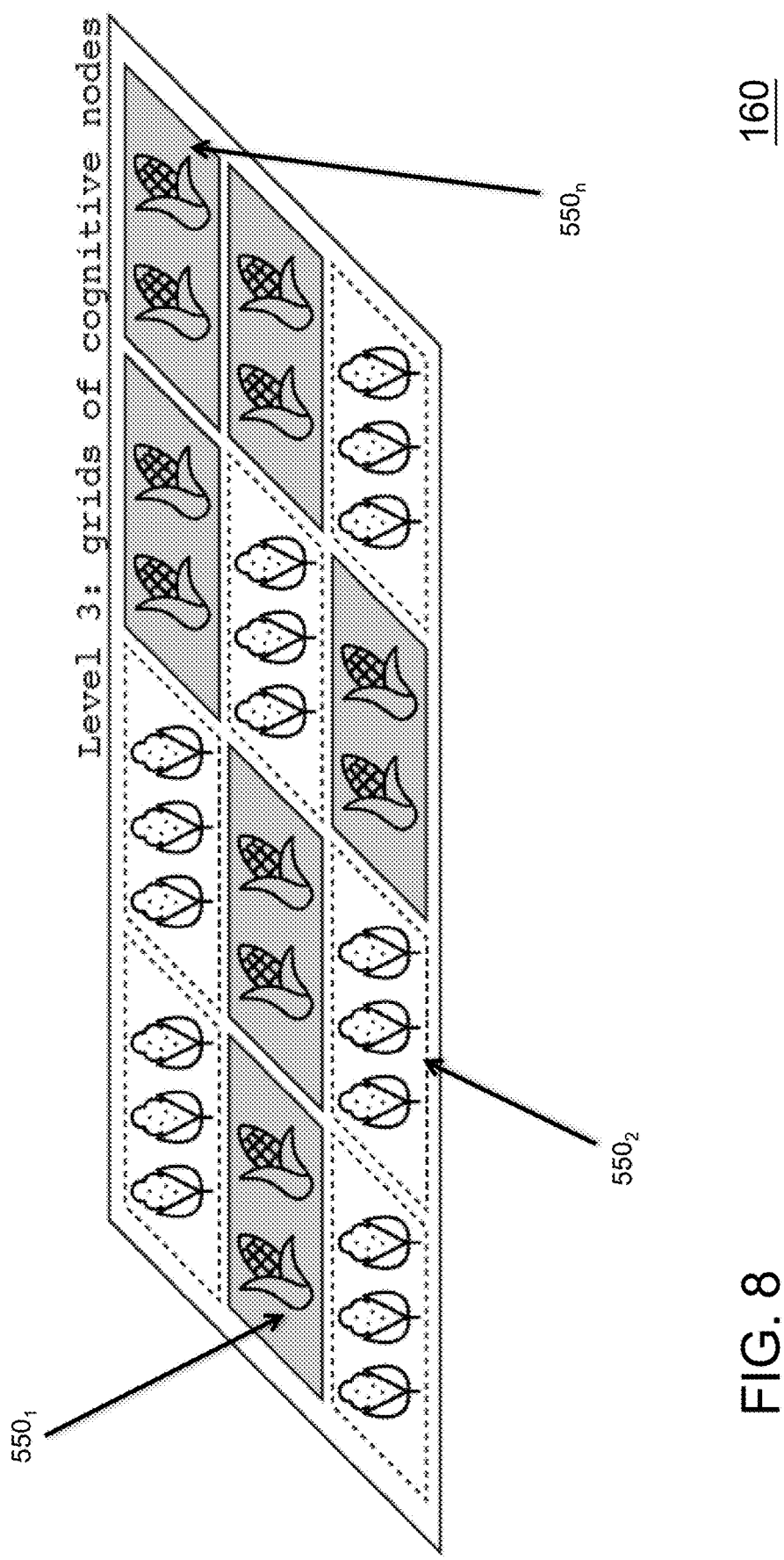
FIG. 8 illustrates level 3 of the grids of cognitive nodes in the exemplary embodiment.

FIG. 8 illustrates the third level 160 of the grids of cognitive nodes in the exemplary embodiment. Multiple CogNodes 130 form a grid 550. The CogNodes can be grouped in a grid by locale, function, any scenario, or any other property. The user 514 needs to define the scenario. For example, what input signals and how they are processed can be the defined scenario. This is the first configuration of the system 10. As previously mentioned, it is initially configured using hardware description languages (HDL), such as VHDL and Verilog, in a way that the hardware will behave as expected, where input signals (in this case, coming from sensors) will be transformed into output signals (ex: fire alarm, crop time, irrigate now, etc.). Once the first configuration is made, new nodes will be automatically added to the system 10 with the same behavior created by the hardware description mentioned above. The CogNodes will not only be able to share the data, but also this configuration (hardware description). For example, if the sensors are deployed in the crops, and have a new program (new behavior) to monitor in the specific manner, that one node can share this behavior with other nodes in monitoring and processing the sensor information in the same grid. This sharing is made by the CPU (central processing unit) or processor 138, and not the neuromorphic chip 136. In addition, this CPU 138 is responsible to update the configuration in the neuromorphic chip 136. As seen in this example, there can be a grid $550_1$ for a crop A, $550_2$ for crop B, and another grid $550_3$ for the same type of crop A.

Figure 9:
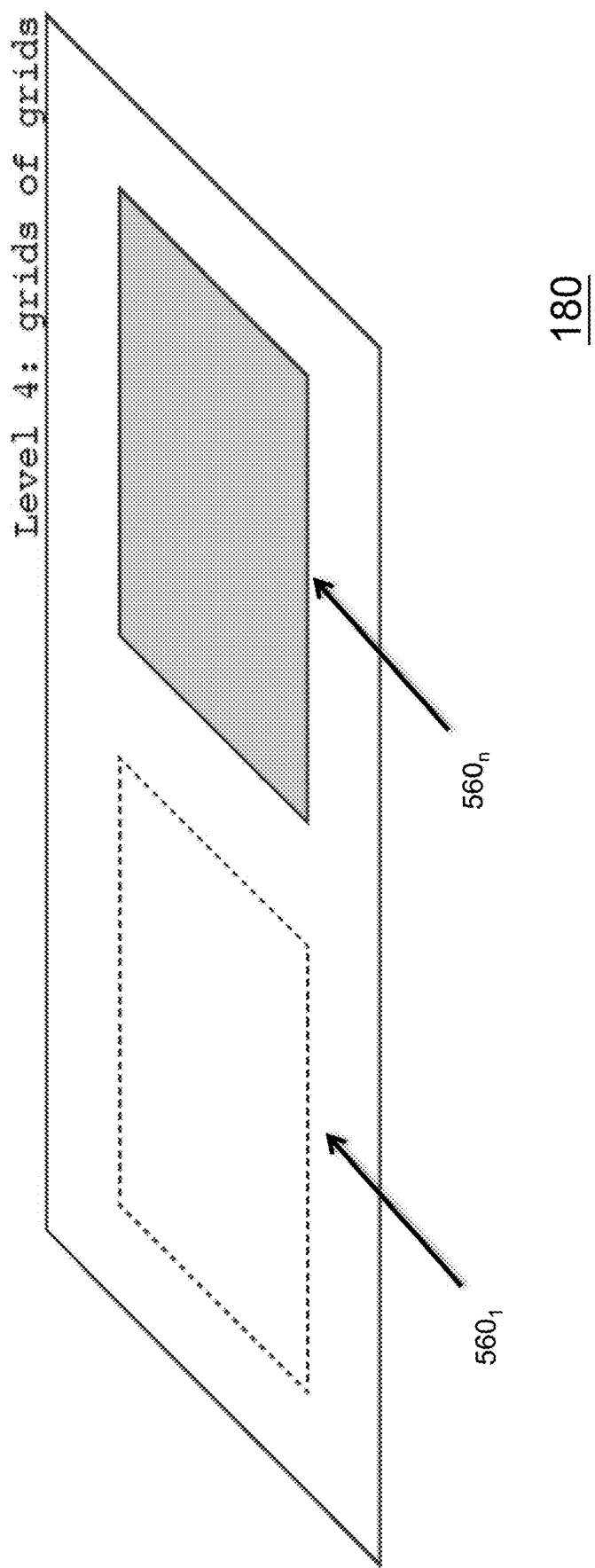
FIG. 9 illustrates level 4 of the grids of grids in the exemplary embodiment.

FIG. 9 illustrates the fourth level 180 of the system 10 showing the grids of grids in the exemplary embodiment. At the highest level 180, similar scenarios can be combined to make management simpler. For both levels 3 and 4, nodes 130 share updates and acquired signals. Users 514 can apply new behaviors on-the-fly. Nodes can help each other in case of failure or irregular recordings. Here different grids of grids $560_1$ to $560_n$ (where n is an integer) are provided in the fourth level 180 of the hierarchy.

Figure 10:
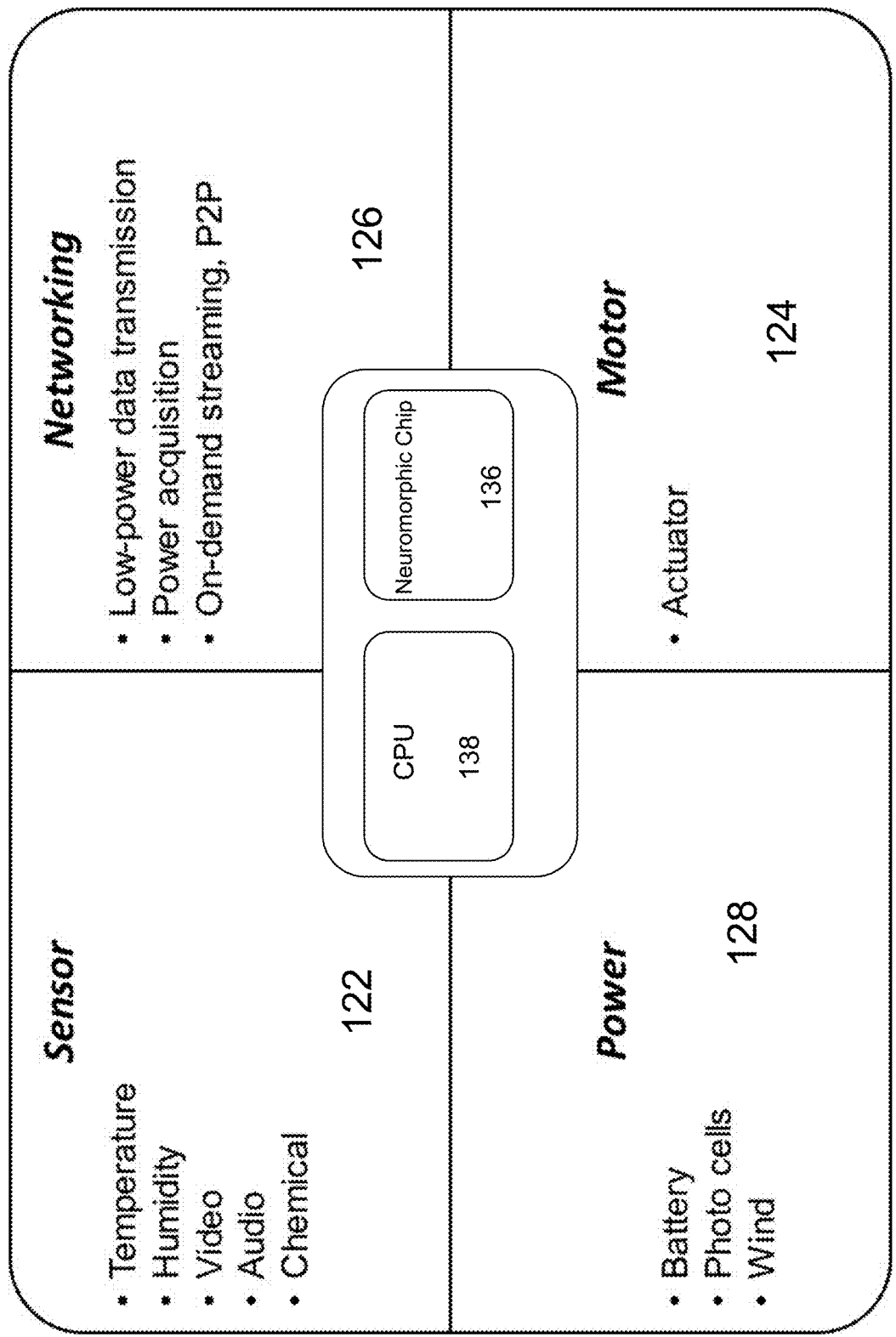
FIG. 10 illustrates the cognitive node elements in the exemplary embodiment.

FIG. 10 illustrates the cognitive node elements in the exemplary embodiment. The CogNode 130 can include a neuromorphic unit 136 and a central processing unit (CPU) 138. The CogNode (cognitive node) 130 can also include sensors 122 for temperature, humidity, video, audio, chemical, etc., detection. There can also be power modules 128 including battery, photo-cells, wind power, etc. The cognitive node 130 can include networking modules 126 for low-power data transmission, power acquisition, on-demand streaming, peer-to-peer (P2P) networking, etc. The CogNode 130 can also include a variety of actuators 124. The CPU 138 supports the neuromorphic unit 136 by setting the neuromorphic unit 136 up, updating the neuromorphic unit 136 and keeping the neuromorphic unit 136 working properly.

The cognitive node has at least two types of processing. One type is a processor that is used for networking and setup of the node. This processor can sleep most of the time to save energy, because setup and networking is rarely used. The second type is the neuromorphic chip that does all the hard work. This chip can work similar to an FPGA (field-programmable gate array), which does not execute a program or a sequence of instructions. Instead, it is initially configured using hardware description languages (HDL), such as VHDL and Verilog, in a way that the hardware will behave as expected, where input signals (in this case, coming from sensors) will be transformed into output signals (ex: fire alarm, crop time, irrigate now, etc.).

Figure 11:
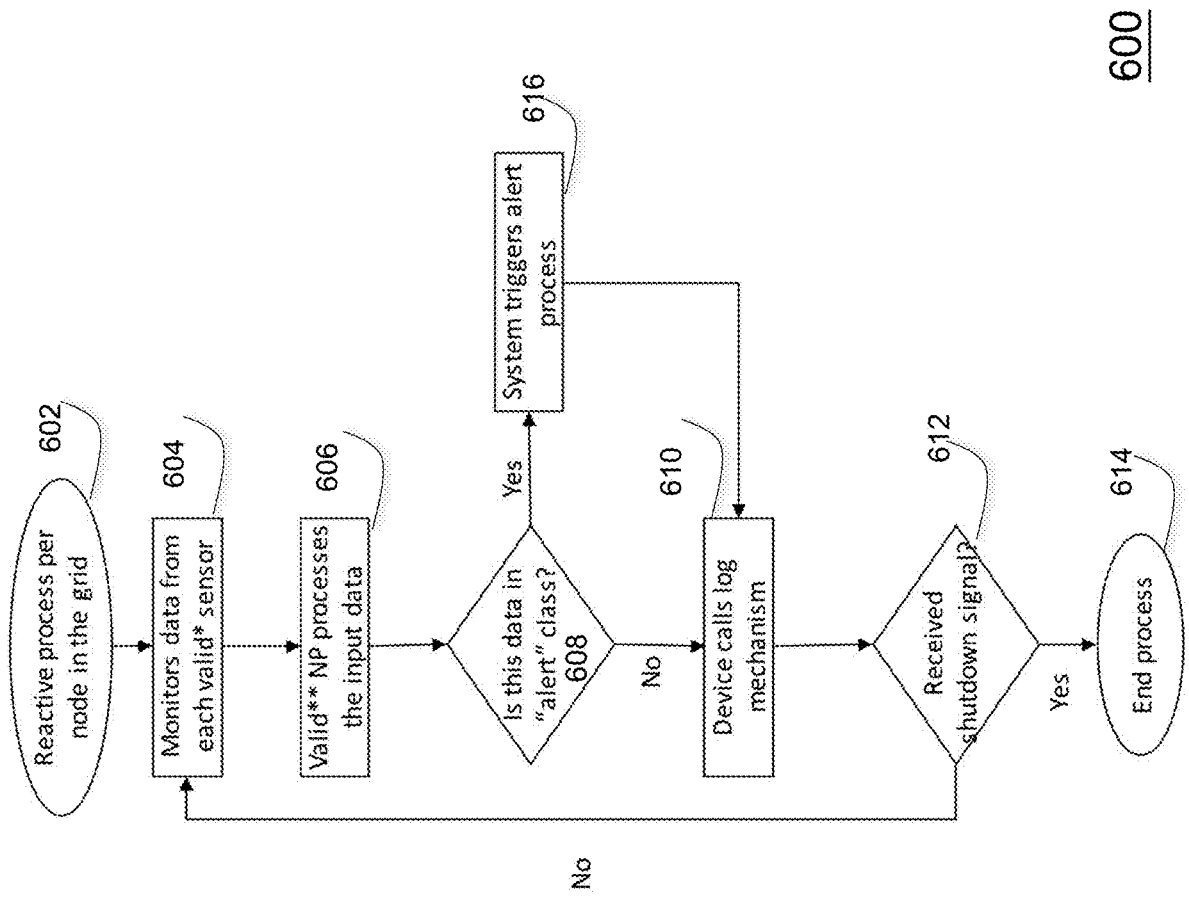
FIG. 11 illustrates the reactive process per node in the grid.
Figure 12:
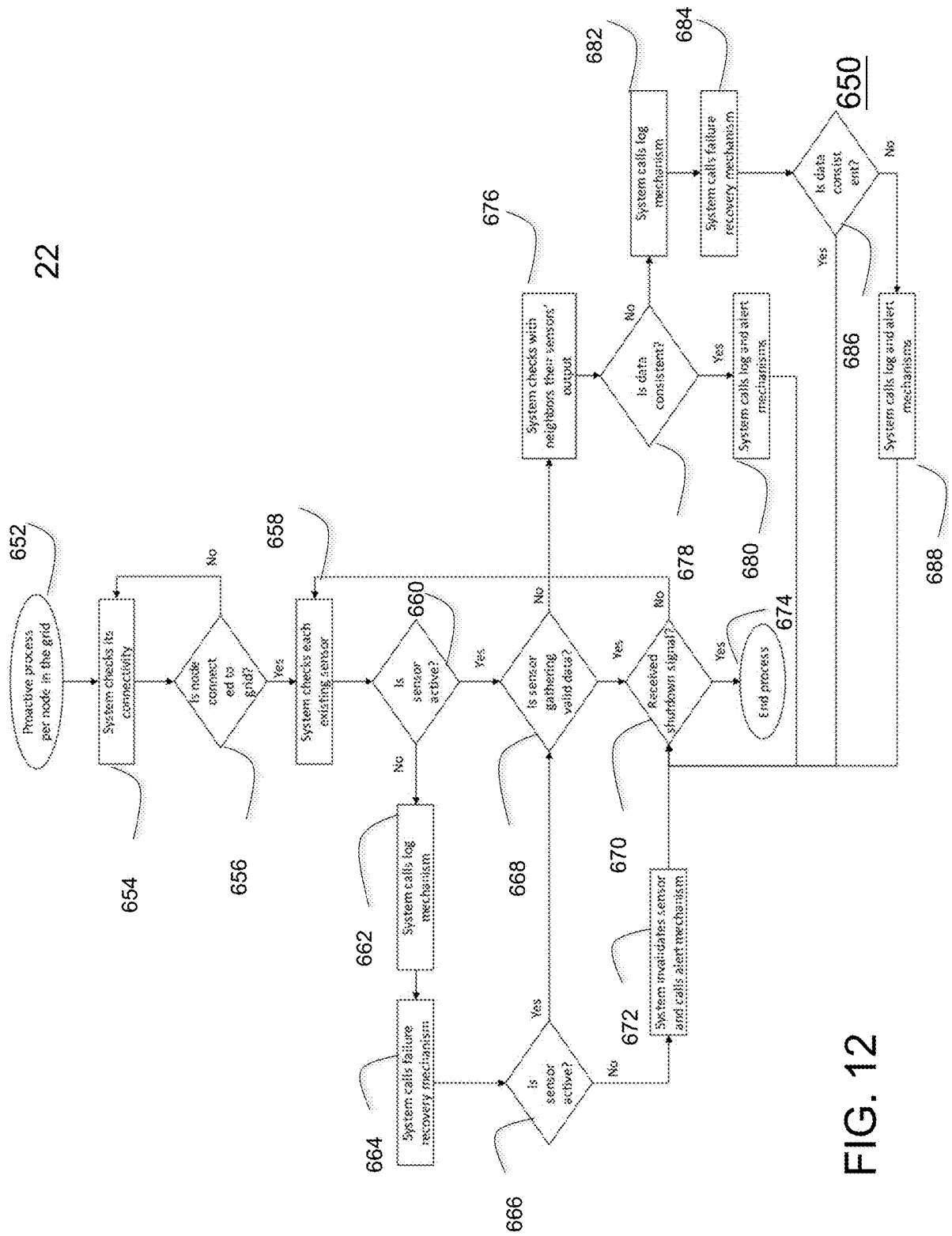
FIG. 12 illustrates the proactive process per node in the grid.

FIG. 11 illustrates the reactive process 600 per node in the grid. FIG. 12 illustrates the proactive process 650 per node in the grid. Each CogNodes 130 continuously runs two different processes: (1) reactive process, as depicted in FIG. 11, and (2) proactive process, illustrated in FIG. 12. The reactive process consists in monitoring data from sensors, detecting whether they are in some state of interest. For example, the CogNode verified that a fruit's characteristics (e.g., color, odor, chemical composition, etc.) indicates harvest time or a disease situation. In turn, the proactive process is responsible to maintain the proper operation of the node, i.e. it will check connectivity status, consistency of sensors and collected data, power resources and motor functionality. The proactive process also includes fault-tolerance mechanisms. That is, CogNodes 130 will try to recover by themselves, or will try to coordinate recovery actions, which include communication with neighbor nodes ("ask for help"), restore last known valid configuration, etc.

Referring to FIG. 11, the reactive process 600 per node in the grid starts at step 602, then the node monitors data from each valid sensor (604). Then, a valid neuromorphic program (NP) processes the input data 606. Thereafter, the node checks whether there is data in the "alert" class 608. If yes, then the system triggers an alert process 616 and then the device calls the log mechanism 610. If the answer is no, then the device calls log mechanism 610. Then, when it is determined that the received shutdown signal is received 612, the process is ended 614, otherwise, then the node monitors again the data from each valid sensor (604).

Referring to FIG. 12, the proactive process per node in the grid 652 starts, and then the system checks its connectivity 654. Thereafter, it is determined whether the node connected to the grid 656. If yes, then the system checks each existing sensor 658, and if no, the system checks connectivity 654 again. After checking each existing sensor 658, it is checked whether the sensor is active 660. If yes, then it is checked whether the sensor is gathering valid data 668 and if no, then the system calls the log mechanism 662. After step 662, the calls a failure recovery mechanism 664 and then it is checked whether the sensor is active 666. Then, the system invalidates the sensor and calls the alert mechanism 672, and thereafter checks to see if the shutdown signal is received 678, thus ending the process at 674.

Going back to the determination of sensor gathering valid data 668, if there is a no answer, then the system checks with neighbors their sensor output 576, and then it is checked whether the data is consistent 678. If yes, then the system call the log and alert mechanism 680 and proceeds the beck if the shutdown signal is received 670. If the data is not consistent 678, then the system calls the log mechanism 682, and then calls failure recovery mechanism 684. Thereafter, a determination is made as to whether the data is consistent 686. If the data is consistent, then the system calls the log and alert mechanism 688, otherwise then it checks whether the shutdown signal is received 670 to determine the end of process 674.

Figure 13:
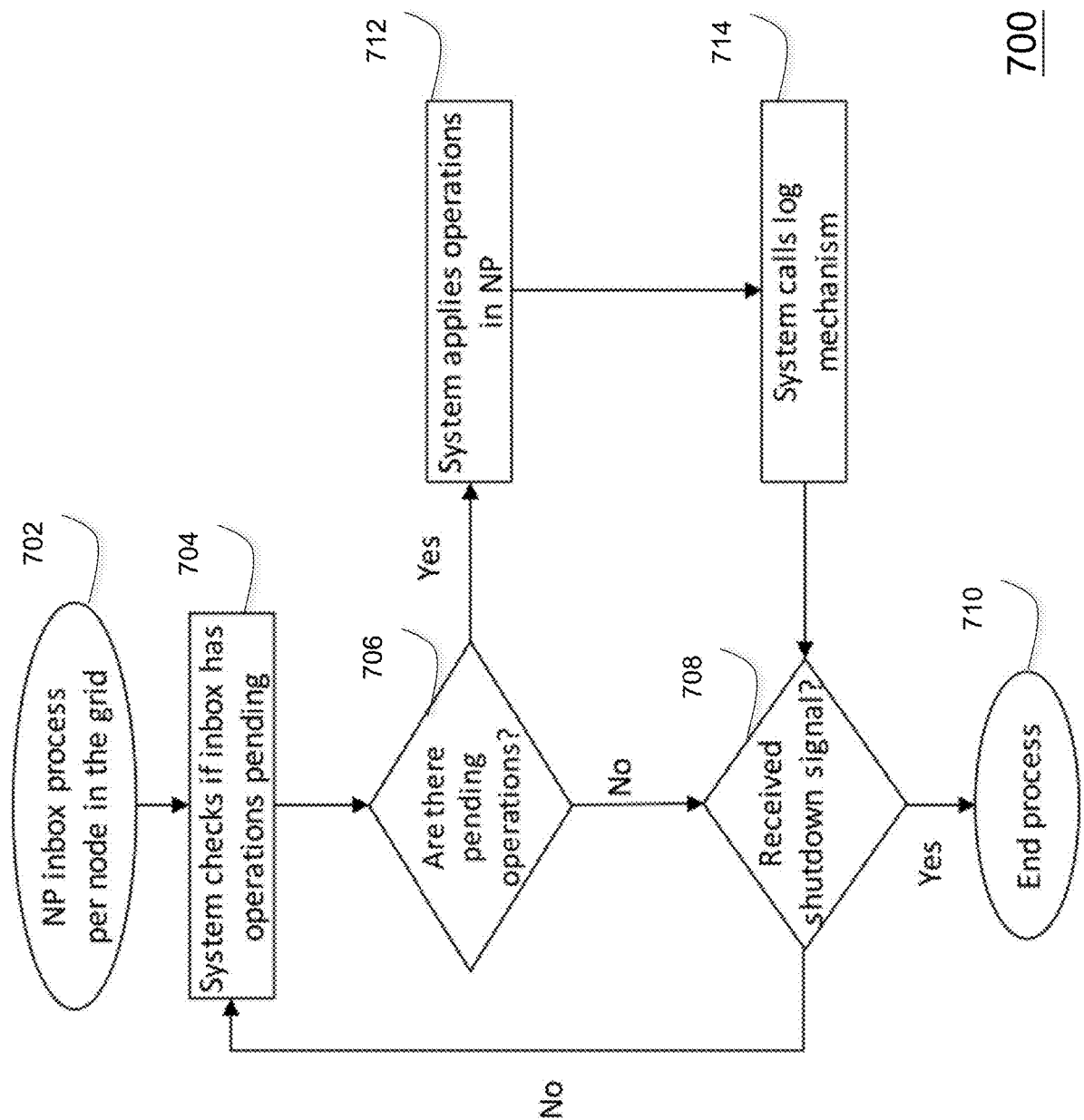
FIG. 13 illustrates the cognitive node inbox handling.

FIG. 13 illustrates the cognitive node inbox handling 700. Deployed CogNodes 130 can be managed from a centralized dashboard. Users 514 can update a node's firmware, and send modifications to the current node's configuration regarding operational mode or new Neuromorphic Programs (NP), i.e. classifiers, controllers, filters, etc. As mentioned previously, Neuromorphic Programs do not define a sequence of operations as observed in regular procedural coding. Instead, NP specifies a neural network topology that will be loaded into the neuromorphic chip. The way users remotely manage nodes are through commands sent to the node's inbox, as depicted in FIG. 13. Inboxes encapsulate all networking functionality and can guarantee command delivery.

Referring back to FIG. 8, the third hierarchy level 160 consists of a logical grid, which comprises a set of logical nodes that are created in an initial configuration step. In this step, users 514 must tag (e.g. by reading RFID, barcode, QR-code, etc.) each physical CogNode 130, creating the logical node in the system's dashboard. Users 514 must associate each logical node 130 to a grid 550 in the system 10. Then, CogNodes 130 may be distributed throughout locations of interest. Within a logical grid 550, nodes 130 autonomously communicate with each other using network protocols (e.g., P2P, OSPF, RIP, etc.) to map available routes and shortest paths between them 130 and the user 514 (See FIG. 7).

Depending on the available nodes 130, users 514 may define a further logical level of organization through the system's dashboard, composing a meta-grid (grid of grids) 560 (See FIG. 9). Nodes 130 present in two or more logical grids 550, may act as gateways or sink nodes. These nodes 130 are autonomously elected based on current available connectivity and routes.

As seen in FIG. 13, the NP inbox process per node in the grid starts 702. Then, the system checks if the inbox has operations pending 704. Then, it is determined if there are pending operations 706. If no, then it is checked whether the shutdown signal is received 708. If yes in step 706, the system applies operations in NP 712, then the system calls the log mechanism 714, and finally goes to check whether the shutdown signal is received 708. The determination at step 708 is yes, then the process ends 710, and if yes, then system checks if the inbox has operations pending 704 again.

Figure 14:
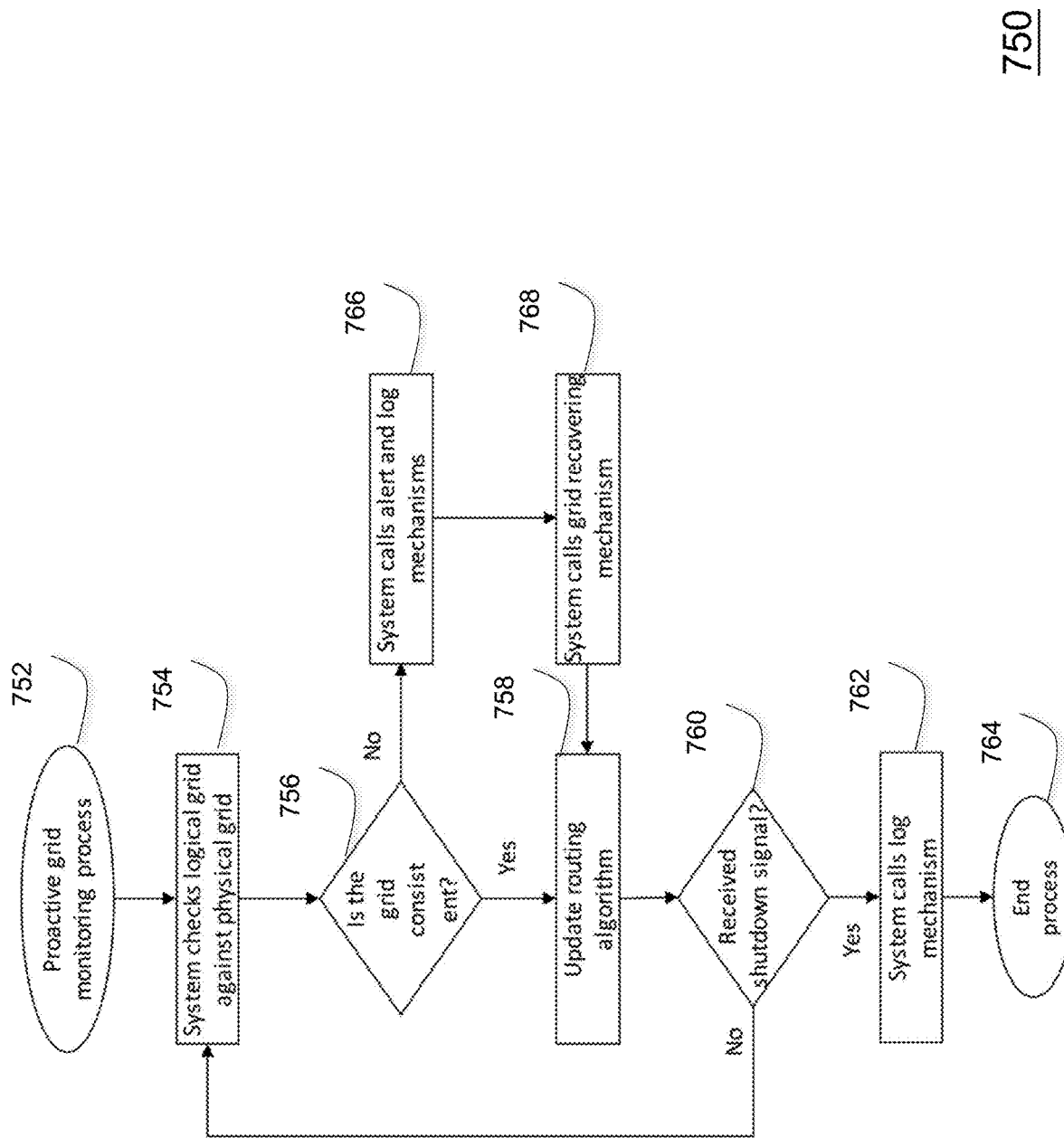
FIG. 14 illustrates the proactive grid monitoring process.

The grid 550 is continuously monitored in a proactive process, depicted in FIG. 14. FIG. 14 illustrates the proactive grid monitoring process 750. The proactive grid monitoring process starts in step 752, and then the system checks the logical grid against the physical grid 754. Then it is checked whether the grid is consistent 756 and if yes, then the system updates the routing algorithm 758, otherwise, the system calls for alert and log mechanism 766. After step 766, the system calls the grid recovery algorithm 768, and then update the routing algorithm 758. After step 758, it is checked whether the shutdown signal is received 760, if no, then the system checks the logical grid against the physical grid 754 again. If step 760 is yes, then the system call the log mechanism 762 and then ends the process 764.

As shown above, currently, there is only centralized solutions. However, in the present invention there is truly decentralized solution. Currently, there is limited number of static rules in case of problem. In the present invention, there is instead learnable fuzzy rules. Each node can notice the interaction of the user 514. For example, the node 130 notices that above 140 degrees Celsius, the user interaction, then the node 130 automatically notes such a response by the user 514 and automatically at 140 degrees Celsius performs the same interaction without user intervention.

Currently, there is a need to transmit a high volume of data. However, in the present invention there is provided real-time event-based data transmission. The information is sent based on an event rather than a transmission of volume of data to be processed.

Currently, there is also an inefficient use of energy instead of the Low-power hardware of the present invention. There is also specialist-based deployment in the current solutions, while in the present invention the setup includes easy deployment and an autonomous setup. For example, a plug and play connection of sensors and actuators can be made.

As shown above, the modular node 130 can include a neuromorphic chip 136, sensors 122 and actuators 124 for IoT (CogNode) 130. Hierarchical organization provides for remote structure and control. The CogNodes 130 can be provided across different levels of abstraction. For example, corn crops in a grid where each have the same types of sensors etc., and another grid may have peas or wheat. The different levels of abstraction are the different logical groupings. The present invention also provides for autonomous peer-to-peer communication among CogNodes 130 for network auto-arrangement. The nodes 130 will find the best route.

There is also sensing resiliency through collaborative work of CogNodes 130. If there is a failure in one node, 130 the neighbors can help. The control of sensors and actuators are according to smart collaborative sensing using CogNodes. User feedback analysis can be used to adjust behavior of CogNodes (i.e. intelligence to control its modules, including sensors, and actuators through, e.g. reinforcement learning)

Therefore, the present invention provides a network of cognitive sensing nodes (CogNodes), each of which uses neuromorphic cores to perform complex processing over sensors' signals locally, but still consuming four orders of magnitude less energy than standard computers. Another advantage of using this solution is that nodes are autonomous and only use communication to send final information (e.g. alarms, motor commands) instead of streaming of signals, which means that the communication can be reduced considerably. Additionally, the present invention create a cognitive resiliency that evolves by itself and adapts according to previously detected problems.

Parts of one or more embodiments may be a device, a system, a method and/or a computer program product to control any aspects of the above mentioned techniques in addition to alternative to the neuromorphic chips mentioned above. The computer program product in accordance with one or more embodiments includes a computer readable storage medium (or media) having program instructions thereon for causing a processor to carry out aspects of one or more embodiments.

Figure 15:
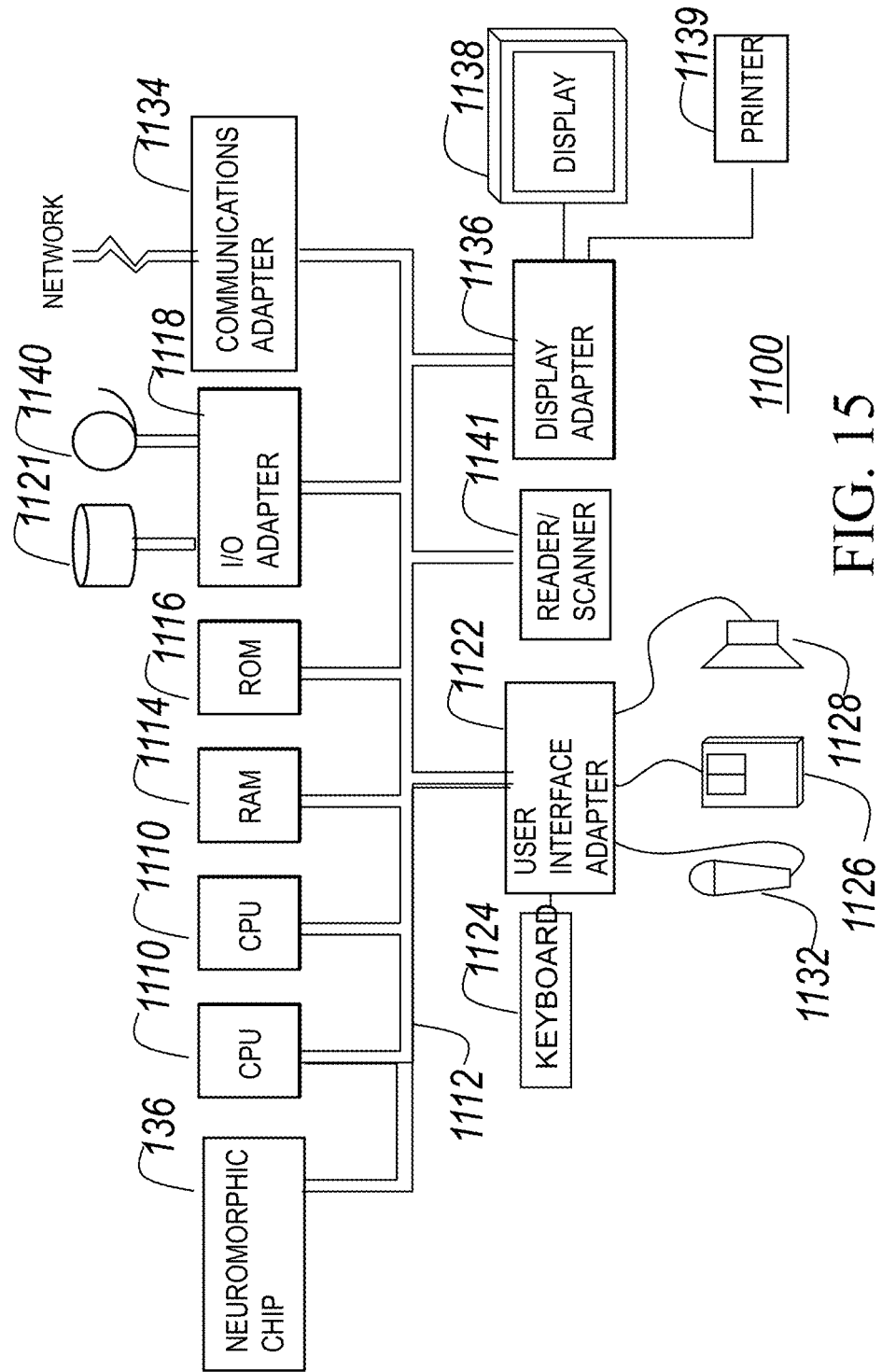
FIG. 15 illustrates an exemplary hardware/information handling system for incorporating the exemplary embodiment of the invention therein.

FIG. 15 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 and a neuromorphic chip 136 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media. The only part of the CogNode 130 that processes data according instructions is the CPU 138 that is used only to support the neuromorphic chip 136, which behaves according to the neuromorphic program (e.g., HDL).

Thus, this aspect of the present invention is directed to a programmed product, including signal-bearing storage media tangibly embodying a program of machine-readable instructions executable by a digital data processor incorporating the CPU 1110, hardware description that configures the behavior of the neuromorphic hardware 136, and hardware above, to perform the method of the invention.

This signal-bearing storage media may include, for example, a RAM contained within the CPU 1110, as represented by the fast-access storage for example.

Alternatively, the instructions and hardware descriptions may be contained in another signal-bearing storage media 1200, such as a magnetic data storage diskette 1210 or optical storage diskette 1220 (FIG. 16), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device and hardware descriptions for the neuromorphic hardware. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions and hardware descriptions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), or a neuromorphic circuit may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 17:
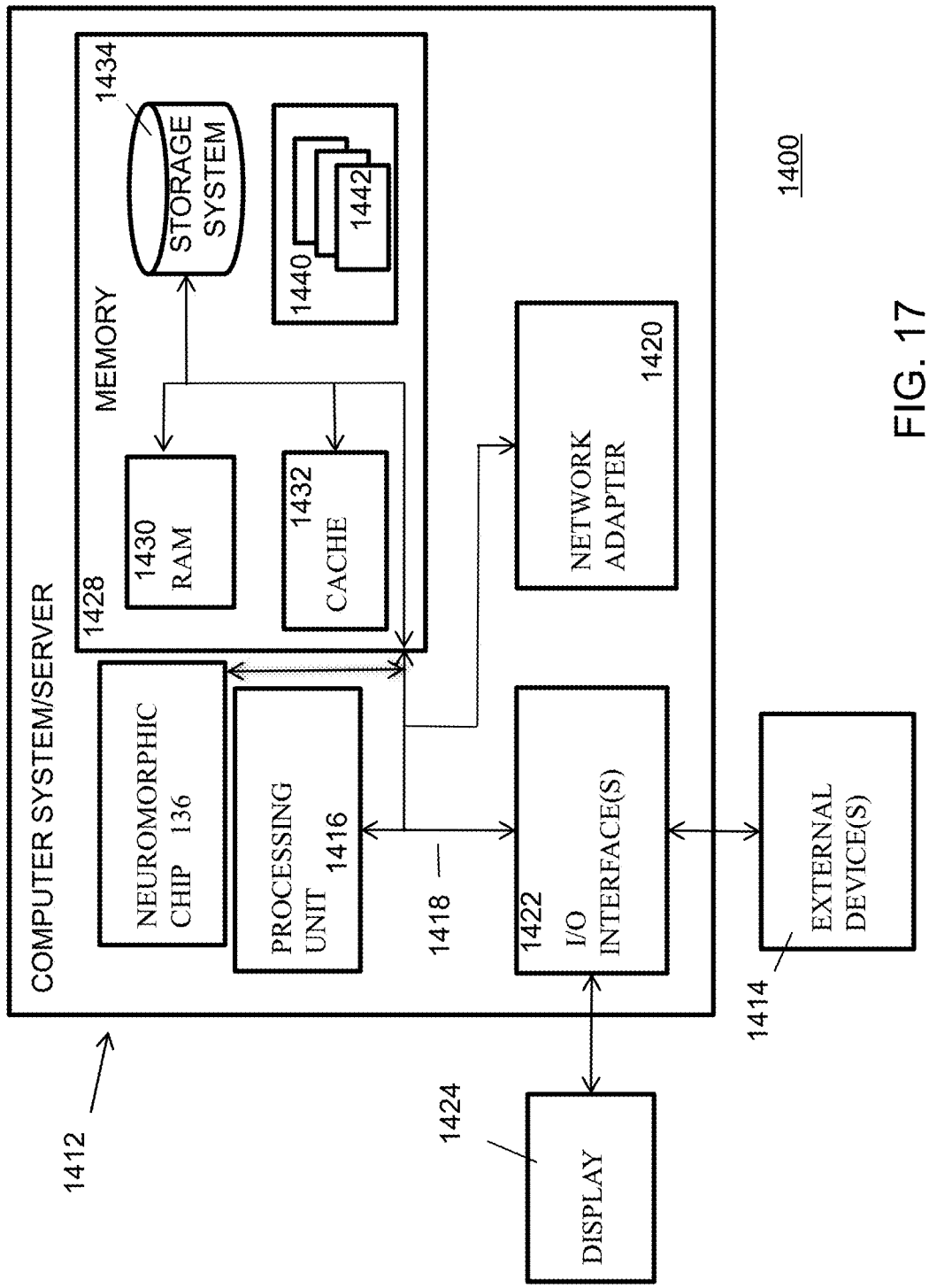
FIG. 17 depicts a cloud-computing node according to an embodiment of the present invention.

Referring now to FIG. 17, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 1412 in cloud computing node 1400 is shown in the form of a general-purpose computing device. The components of computer system/server 1412 may include, but are not limited to, one or more processors or processing units 1416, a neuromorphic chip 136, a system memory 1428, and a bus 1418 that couples various system components including system memory 1428 to processor 1416. The input signals can be processed by the neuromorphic chip 136 instead of the processing units 1416 processing the input signals.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 18:
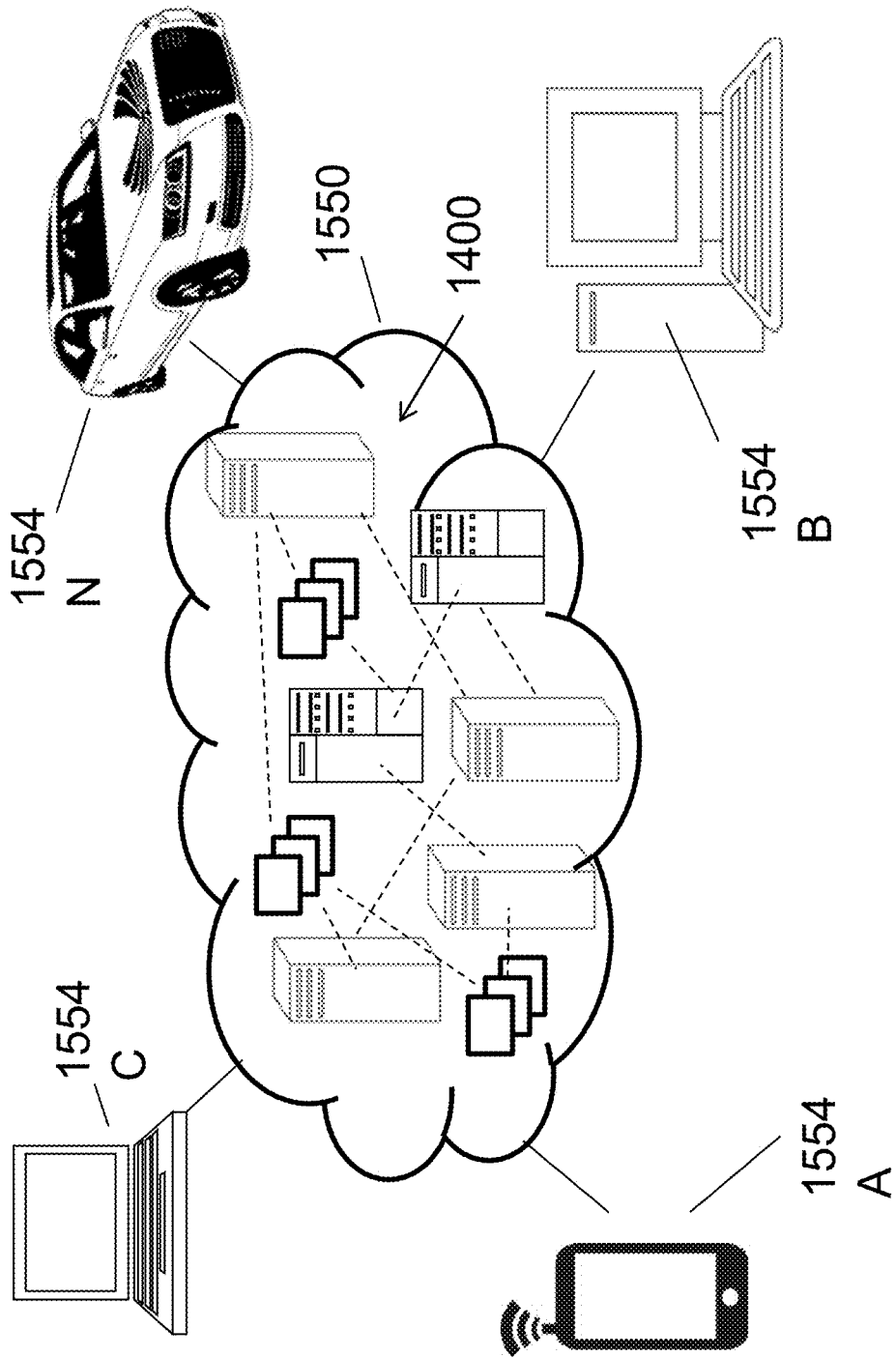
FIG. 18 depicts a cloud computing environment according to an embodiment of the present invention.

Referring now to FIG. 18, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 18 are intended to be illustrative only and that computing nodes 1400 and cloud computing environment 1550 can communicate with any type of computerized device over any type of network and/or network addressable connection (e.g., using a web browser).

Figure 19:
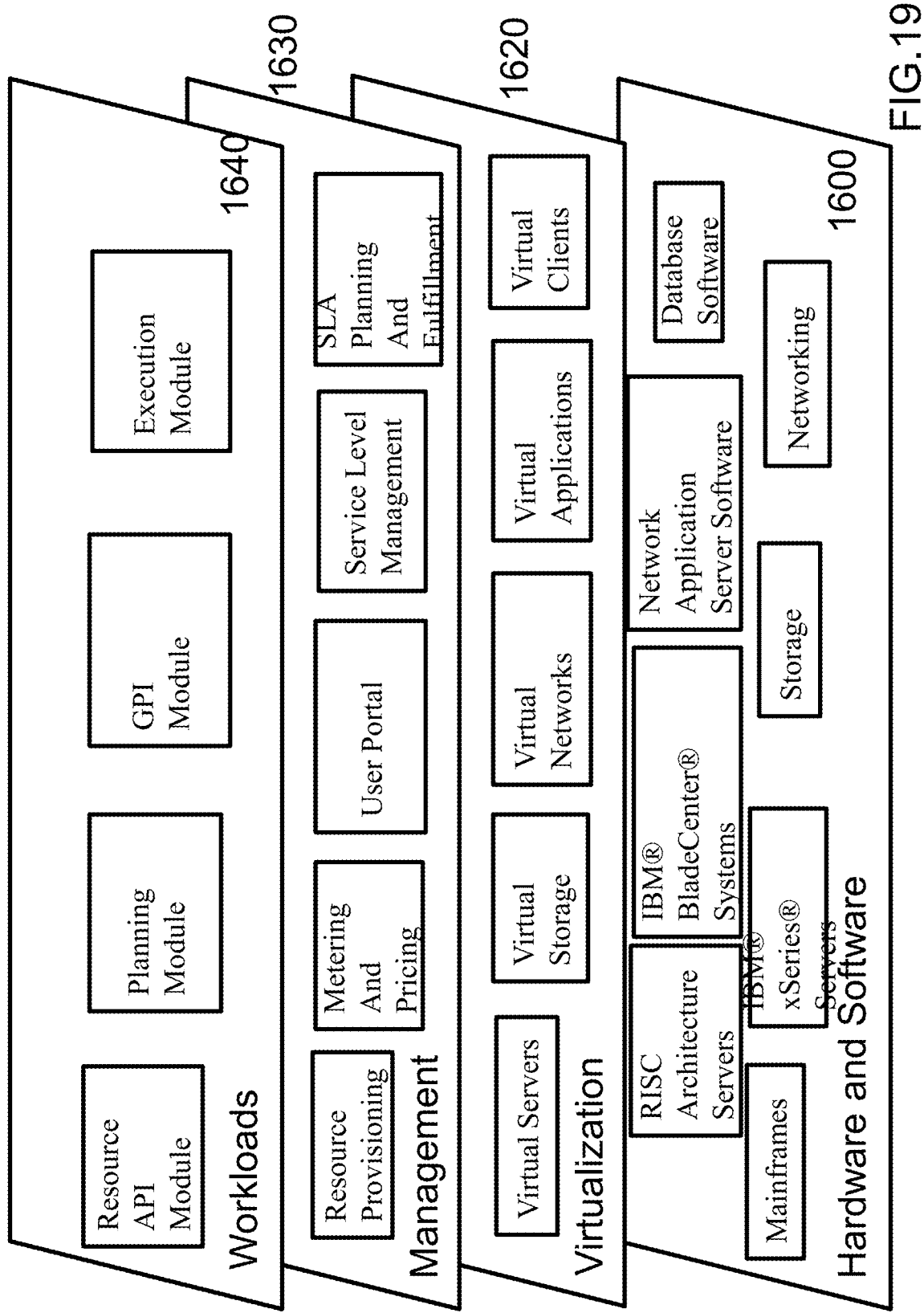
FIG. 19 depicts abstraction model layers according to an embodiment of the present invention.

Referring now to FIG. 19, a set of functional abstraction layers provided by cloud computing environment 1550 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; IBM's TrueNorth, RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, TrueNorth and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud-computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cognitive node, comprising:
   modular sensors to detect events or changes in an environment;
   modular actuators for moving or controlling an object;
   a non-transitory computer readable medium storing a program;
   a processor executing the program configured to:
     control a plurality of cognitive nodes networking and setup by grouping a subset of cognitive nodes by locale or function as a grid through user defined program routines;
     sharing the cognitive node configuration programs and updates to neighboring cognitive nodes in the grid;
   a power solution;
   a low-power wireless network module;
   a neuromorphic unit configured to:
     autonomously process received information from the modular sensors and modular actuators, wherein the modular sensors and actuators are plugged into a modular slot of the cognitive node, and communicates with other plurality of cognitive nodes through the low-power wireless network module;
     determine a validity of the information received from the modular sensors and the modular actuators, wherein the validity comprises concurrent monitoring of a connectivity status of the cognitive node, a consistency of the plurality of modular sensors and the modular actuators, power resources used by the cognitive node, and motor functionality of the cognitive node;
     autonomously communicate with neighboring cognitive nodes for network auto-arrangement,
   wherein the autonomous communication includes automatically requesting without manual input and receiving information processed by neighboring cognitive nodes when any information is received from the modular sensors,
   wherein the autonomous communication includes requesting and receiving information processed by neighboring cognitive nodes in the grid when any information received from the modular sensors and the modular actuators is determined to be invalid and when the information is valid, outputting the information,
   wherein the autonomous communication includes requesting and receiving configuration information from the neighboring cognitive nodes in the grid to restore a last known valid configuration, after receiving invalid information from the modular sensors or the modular actuators, and
   wherein the network auto-arrangement includes autonomous peer-to-peer communication among cognitive nodes.

2. The cognitive node according to claim 1, wherein the neuromorphic unit includes learning based on the determination of the validity of the information, autonomous processing and communication, and
   further comprising performing network auto-arrangement based on autonomously communicating with neighboring cognitive nodes for network auto-arrangement.

3. The cognitive node according to claim 1, wherein the neuromorphic unit processes and outputs fuzzy processed information for learning where there is an identification of interactions with users, automatic notation of responses by the user, and then automatically perform the same interaction without user intervention,
   wherein when one of the modular sensors is malfunctioning, the neuromorphic unit autonomously requests for help from another cognitive node to share information,
   wherein the neuromorphic unit includes learning based on the determination of the validity of the information, and autonomous processing and communication, and
   wherein when there is a problem in one of the modular sensors, the neuromorphic unit autonomously requests for help from a second cognitive node to share information from another modular sensor communicating with the second cognitive node.

4. The cognitive node according to claim 1, wherein the processor sends out a processed output,
   wherein the processor determines an optimal path of communication through neighboring cognitive nodes autonomously,
   wherein when one of the modular sensors is unable to detect information, the neuromorphic unit autonomously requests for help from another cognitive node to share information,
   wherein the neuromorphic unit includes learning based on the determination of the validity of the information, and autonomous processing and communication, and
   wherein when there is a problem in one of the modular sensors, the neuromorphic unit autonomously requests for help from a second cognitive node to share information from another modular sensor communicating with the second cognitive node.

5. A hierarchical system including a plurality of cognitive nodes according to claim 1.

6. A grid grouping logically a plurality of cognitive nodes according to claim 1, wherein communication among the plurality of cognitive nodes being made according to the logical grouping of the plurality of cognitive nodes.

7. A logical grouping of the grids according to claim 6, wherein communication among the grids being made according to the logical grouping of the grids.

8. A method of a cognitive node, the method comprising:
   a cognitive node, comprising:
     modular sensors to detect events or changes in an environment;
     modular actuators for moving or controlling an object;
     a processor executing a program configured to:
       control a plurality of cognitive nodes networking and setup by grouping a subset of cognitive nodes by local or a function as a grid through user defined program routine;
       sharing the cognitive node configuration programs and updates to neighboring cognitive nodes in the grid;
     a power solution;
     a low-power wireless network module;
     a neuromorphic unit configured to:
       autonomously process received cognitive node information from the plurality of modular sensors and modular actuators, wherein the modular sensors and actuators are plugged into a modular slot of the cognitive node, and communicates with other plurality of cognitive nodes through the low-power wireless network module;

determining a validity of the cognitive node information received from the modular sensors and actuators, wherein the validity comprises concurrent monitoring of a connectivity status of the cognitive node, a consistency of the plurality of modular sensors and the modular actuators, power resources used by the cognitive node, and motor functionality of the cognitive node;

autonomously communicating with neighboring cognitive nodes for network auto-arrangement, wherein the autonomous communication includes requesting and receiving cognitive node information processed by neighboring cognitive nodes in the grid if any cognitive node information is received from the modular sensors and the modular actuators, wherein the autonomous communication includes requesting and receiving configuration information from the neighboring cognitive nodes in the grid to restore a last known valid configuration, after receiving invalid information from the modular sensors or the modular actuators, and wherein the network auto-arrangement includes autonomous peer-to-peer communication among cognitive nodes.

9. The method according to claim 8, wherein the autonomously communicating includes requesting and receiving cognitive node information processed by neighboring cognitive nodes when any cognitive node information received from the modular sensors and the modular actuators is determined to be invalid.

10. The method according to claim 8, further comprising of processing the cognitive node information and outputting the processed cognitive node information according to fuzzy logic, wherein the network auto-arrangement includes autonomous peer-to-peer communication among a plurality of cognitive nodes, and further comprising grouping the plurality of cognitive nodes by a function as a grid of the plurality of cognitive nodes.

11. The method according to claim 8, further comprising of determining an optimal path of communication through neighboring cognitive nodes.

12. The method according to claim 8, wherein a plurality of the cognitive nodes are grouped hierarchically.

13. The method according to claim 8, wherein grid grouping logically a plurality of the cognitive nodes are logically grouped into a grid, and
wherein communication among the plurality of cognitive nodes being made according to the grouping of the cognitive nodes.

14. The method according to claim 13, wherein a plurality of the grids are logically grouped, and
wherein communication among the grids being made according to the grouping of the grids.

15. A computer program product for distributed and fault tolerant hierarchical autonomous cognitive instrumentation, the computer program product comprising a computer readable storage medium having program instructions embodied therewith, the program instructions and hardware descriptions readable and executable by a computer to cause the computer to:
execute a cognitive node, comprising:
modular sensors to detect events or changes in an environment;
modular actuators for moving or controlling an object;
a processor executing a program configured to:
control a plurality of cognitive nodes networking and setup by grouping a subset of cognitive nodes by local or a function as a grid through user defined program routine;
sharing the cognitive node configuration programs and updates to neighboring cognitive nodes in the grid;
a power solution;
a low-power wireless network module;
a neuromorphic unit configured to:
autonomously process received cognitive node information from a plurality of modular sensors and modular actuators, wherein the modular sensors and actuators are plugged into a modular slot of the cognitive node,
determine a validity of the cognitive node information received from the modular sensors and actuators, wherein the validity comprises concurrent monitoring of a connectivity status of the cognitive node, a consistency of the plurality of modular sensors and the modular actuators, power resources used by the cognitive node, and motor functionality of the cognitive node;
autonomously communicate with neighboring cognitive nodes for network auto-arrangement without manual input,
wherein the autonomous communication includes requesting and receiving information processed by neighboring cognitive nodes in the grid when any information received from the modular sensors and the modular actuators is determined to be invalid and when the information is valid, outputting the information,
wherein the autonomous communication includes requesting and receiving configuration information from the neighboring cognitive nodes in the grid to restore a last known valid configuration, after receiving invalid information from the modular sensors or the modular actuators, and
wherein the network auto-arrangement includes autonomous peer-to-peer communication among a plurality of nodes.

16. The computer program product according to claim 15, wherein the autonomous communication includes requesting and receiving cognitive node information processed by neighboring cognitive nodes when any cognitive node information received from the modular sensors and the modular actuators is determined to be invalid.

17. The computer product according to claim 15, further comprises to process the cognitive node information and outputting the processed cognitive node information according to fuzzy logic.

18. The computer product according to claim 15, further comprises to determine an optimal path of communication through neighboring cognitive nodes.

19. The computer product according to claim 15, wherein a plurality of the cognitive nodes are grouped hierarchically,
wherein the plurality of the cognitive nodes is logically grouped into a grid, and wherein communication among the plurality of cognitive nodes being made according to the grouping of the cognitive nodes.

20. The computer product according to claim 15, wherein a plurality of the grids are logically grouped, and wherein communication among the grids being made according to the grouping of the grids.

* * * * *